Figure 1:
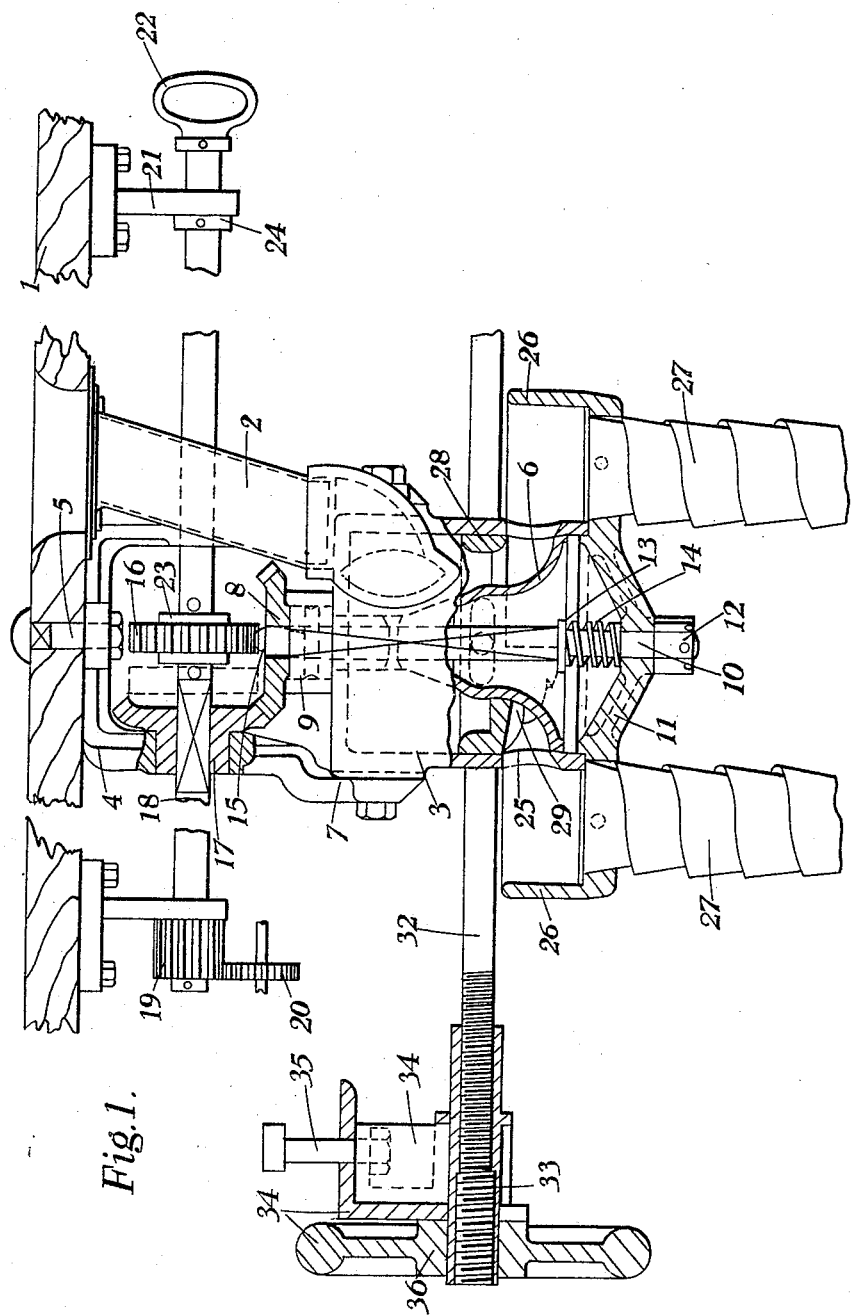

Aug. 30, 1932.   H. M. LEAKE   1,875,036
SEED DRILL
Filed May 9, 1930   2 Sheets-Sheet 1

INVENTOR,
Hugh Martin Leake
BY
Henry J. Lucke
HIS ATTORNEY

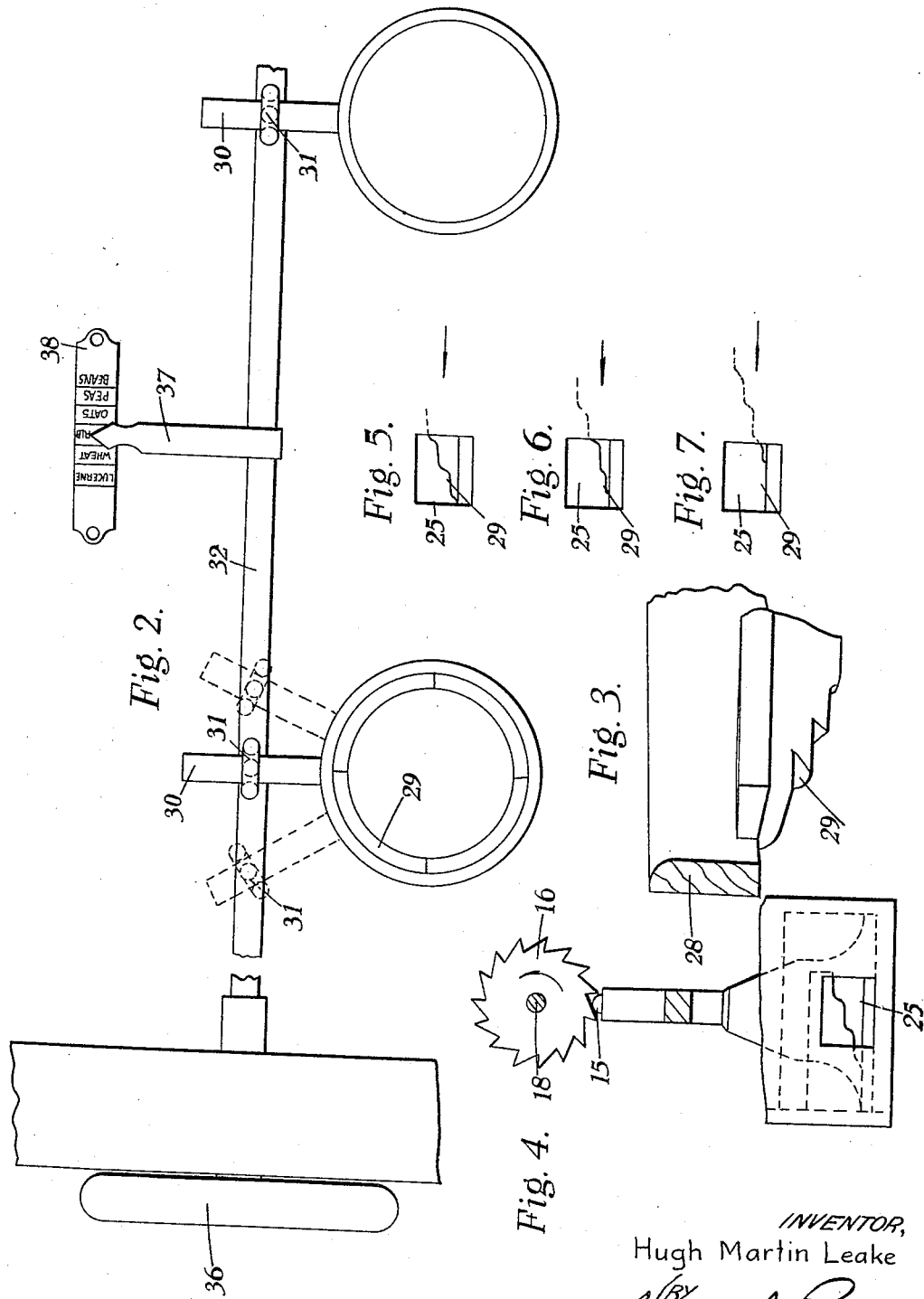

Patented Aug. 30, 1932

1,875,036

UNITED STATES PATENT OFFICE

HUGH MARTIN LEAKE, OF CAMBRIDGE, ENGLAND

SEED DRILL

Application filed May 9, 1930, Serial No. 451,055, and in Great Britain May 21, 1929.

Experimental work has established the fact that there is close correlation between the uniformity of spacing of seed in sowing and the crop yielded. It has also been demonstrated that spacing, as resulting from the ordinary type of seed drill, is so far from perfect that an increase of yield of some 25% may be anticipated as the result of uniform spacing.

In practice it has been found that the ordinary cup drill fails in two important respects. Firstly, there is irregularity in uptake by the cups, and secondly, there is irregularity of fall, largely due to the jolts given to the machine when passing over rough ground. Both of these failings contribute towards irregularity of feed and consequent lack of uniformity of spacing in the sowing. Another common type of seed drill in use, viz., the force feed type, has proved in practice to be even more irregular in feed.

The primary purpose of this invention is to reduce as far as possible lack of uniformity of spacing by ensuring regular feed of seed to the coulters, either in a steady stream or at regular intervals.

In accordance with one important object of the invention, each coulter is supplied with seed by a mechanical feeding device, which not only feeds the seed uniformly to an ejection aperture leading to the coulter, but also causes certain ejection of the seed through said aperture.

The above result is accomplished by ejecting the seed into the coulter tube from a distributing device, comprising in combination a cylindrical seed receiving box or casing, having an ejection aperture in its peripheral wall, a baffle member screening said opening except from one peripheral direction, and a rotating member which carries the seed peripherally behind said baffle for ejection through said aperture. In order to facilitate rapid ejection of the seed, the edge portion of the rotating member may slope downwardly towards the wall of the distributor. For example, the rotating member may consist of a rotating disc having a bevelled edge, whilst the ejection aperture in the casing is on a level with the bevelled edge of the rotating disc, said bevelled edge carrying the seed to the ejection aperture, whereafter, due to the slope of the bevelled edge of the disc, the seed falls by its own weight, and is discharged radially through the ejection aperture.

Preferably, however, the rotating member is substantially cone shaped, with either a flat sloping surface, or a concave sloping surface, so that the seed constantly tends to travel radially of the rotating member, and does not collect in a dead space in the centre.

In accordance with another important object of the invention, the improved machine may include means for vibrating the rotating member in a vertical direction, for the purpose of preventing any jamming and bunching up of the seed liable to interfere with the continuous discharge of the seed through the aperture. The provision of such means is particularly important for the larger seeds, but it is not necessary for very small seeds. Therefore, I may provide mechanical vibrating means which is adapted to be thrown out of action at will.

In accordance with still another important object of the invention, if it is desired that the same machine may be used for sowing many different kinds of seeds of widely varying sizes, the baffle member or members is or are adjustable within the seed box or casing, in such manner as to vary the effective size of the ejection aperture or apertures. Preferably, the baffle member is shaped so that by peripheral adjustment thereof the effective height of the ejection aperture, or the effective width, or both, may be varied. A suitable shape for the operative edge of the baffle member is one of stepped formation.

Further objects and features of the invention will appear from the following description with reference to the accompanying drawings, illustrating the invention by way of example only, and the invention will hereinafter be precisely defined in the claims appended hereto and forming part of this specification.

In the drawings:

Figure 1 is a sectional view of one construction of feeding or distributing mechanism for seed drills according to the invention, Figure 2 illustrates the adjusting means for different classes of seeds, Figure 3 is an enlarged view showing one of the baffle members, and Figures 4, 5, 6 and 7 are diagrams illustrating the action of the baffle member.

The improved seed drill according to the present invention is generally of well known form, to the extent that it comprises a seed box or hopper carried by a frame mounted upon a pair or more of land wheels, there being generally a row of any desired number of coulters distributed across the back of the machine and fed through coulter tubes by feeding or distributing devices which receive seed from the hopper and transfer it in small quantities to the coulter tubes. It should be noted, however, that the invention may be applied to seed drills, for hand use, which have only a single coulter and tube.

As will be appreciated from what has already been said, the present invention relates primarily to the feeding or distributing means, which prior to this invention have been almost invariably of either the "cup", or the "force feed" type. According to this invention, however, the seed passes from the seed box or hopper, the bottom of which is indicated by the reference 1 in the drawings, through tube 2 into a feed box or casing 3 fastened beneath the floor 1 of the hopper by means of a bracket 4 and bolt 5. The box or casing 3 constitutes the distributing chamber, and it contains a rotating member 6 which is generally of cone shape, but has a concave inclined surface curving outwardly to the peripheral edge of the member 6.

This cone shaped member 6 is mounted on a square spindle 7, the upper end of which has a sliding engagement with a bevel wheel 8, the boss of which is journalled in the bearing sleeve 9 on the upper end of the casing 3. At its lower end the spindle 7 is turned cylindrically, and is journalled in a bearing 10 disposed beneath the casing 3 and carried by spider arms 11. On the lower end of the spindle 7 is provided a nut 12, and between the bearing 10 and a washer 13 bearing against the shoulder on the spindle 7 formed by cylindrically turning its end portion, is disposed a spring 14. At its upper end the spindle 7 carries a rounded pip 15, preferably of hardened steel, which is adapted to make contact with a toothed wheel 16.

The bevel gear 8 meshes with another bevel gear 17 mounted on a squared portion of a shaft 18 which is slidable therethrough. This shaft 18 extends completely across the back of the machine and is adapted to drive the series of distributors which the machine carries. For this purpose one end of the shaft 18 may carry a wide gear pinion 19 meshing with a gear 20 driven, if necessary through other gears, from the axle of the machine which is rotated by one of the land wheels of the machine.

At the opposite side of the machine the shaft 18 may be journaled in a bracket 21 fastened to the hopper floor 1, and may carry a handle 22. As already indicated, the shaft 18 has a sliding engagement with the bevel wheels 17 of all of the distributors, but the toothed wheels 16 of all of the distributors are fixed to said shaft 18 between discs or collars 23. Consequently, by moving the handle 22 to the left of Figure 1, the toothed wheel 16 can be moved into the position indicated by dotted lines, out of engagement with the pip 15, without interfering with the drive of the bevel wheels 17. The wide gear pinion 19 on the end of the shaft 18 permits this endwise movement of the shaft 18 without interruption of the drive. The endwise movement of the shaft 18 is limited in one direction by a collar 24 which engages against the bearing bracket 21, and in the other direction by the handle 22. Thus it will be seen that by manipulation of the handle 22, the toothed wheels 16 can be brought into or out of engagement with the pips 15 of the distributors.

If the toothed wheels 16 are in the position shown in Figure 1, i. e. engaging with the pips 15, as the shaft 18 rotates, each distributing cone member 6 will be rotated through bevel gears 8 and 17, whilst at the same time it will be vibrated in a vertical direction, due to the striking of the pip 15 by the teeth of the wheel 16, and the action of the spring 14. The wheel 16 is preferably provided with ratchet teeth so disposed as to give the cone 6 a comparatively slow downward movement, but a sudden upward movement, so as to eject the seed more efficiently.

The casing 3 is provided at diametrically opposite points with two seed discharge apertures 25 opening into cups 26 terminating the upper ends of a pair of coulter tubes 27. The lower edges of said apertures 25 are chamfered or cut away to avoid any tendency to seed blockages forming in front of the apertures. Within the casing 3, above the feed cone 6, is provided a ring 28 having baffle members 29 extending inwardly therefrom into contact with the surface of the cone 6. These baffle members may extend peripherally of the casing to any suitable and desired extent greater than twice the width of the apertures 25, and are generally of the shape illustrated by Figure 3, the lower edge of the outer surface, which makes contact with the inner wall of the casing 3, being of stepped formation.

The baffle ring 28 is adapted to be rotated within the casing 3, so that the baffle members 29 may cover the apertures 25 to varying extents. For this purpose a pin 30 passes through a slot 31 in the wall of the casing 3 into the ring 28, and the outer end of said pin 30 passes through an eye member 31 swivelled on a bar 32 extending across the back of the machine. The pins 30 of all the distributors are associated with the bar 32 in a similar manner. At one side of the machine the end portion of the bar 32 is screw threaded to engage in an internally screwed socket 33 rotatable in a bracket 34 fastened to the machine by a bolt 35, by a hand wheel 36. By rotating the hand wheel 36 the bar 32 is drawn laterally across the machine, and moves the pins 30 so as to rotate the baffle carrying rings 28. At a convenient point the bar 32 carries a pointer 37 co-operating with a scale 38 fixed on the machine. This scale 38 carries a number of marks or lines, against which are printed the names of seeds of various sizes.

The action of the baffle members 29 regulating the effective size of the discharge apertures 25 in the casing 3 will be apparent from Figures 4 to 7 inclusive. In Figure 4 the baffle member 29 is shown in position for the sowing of the larger sizes of seeds, such, for example, as beans. In Figure 5 the baffle member is shown moved partly to the right so that the portion of the aperture 25 of maximum height is reduced in width. In Figure 6 the baffle member 29 is moved still further to the right, so that the open portion of the aperture is only of very small height, whilst in Figure 7 the effective size of the discharge aperture is of the minimum height, and very nearly of the minimum width.

It will be understood that the seeds carried by the cone 6 can only approach the apertures 25 in the direction indicated by the arrows in Figures 4 to 7, and are only discharged singly or in a narrow stream through the ejection apertures 25, provided that these apertures are cut down to a sufficiently small effective size. By manipulating the handle 36, the baffle members 29 can be set in suitable positions to deal with the particular seed which has to be sown. For the largest size of seeds the baffle members are set so that none, or only a portion of the height and/or width of the ejection aperture is cut off, and by advancing the baffle member across the ejection aperture, the effective width of the aperture is reduced, since only a part of the width of the opening is of sufficient height to permit passage of the seeds.

The steps on the baffle member 25 may be of different heights and/or widths, and their surfaces may slope so that the effective height of the aperture gradually decreases across its width, although the surfaces of the steps may be horizontal, i. e. parallel to the bottom of the casing 3, if desired. Sloping of the surfaces of the steps has the advantage of allowing a limited margin of variation in the sizes of the seeds capable of passing through the ejection aperture.

Although the feed box or casing 3 is shown as having a closed top, yet I may make the top of the casing open, so that access may be readily had to the interior of the casing when required, for example, for clearing any blockages which may arise. In this case, the bearing sleeve 9 may be carried by a spider similarly to the lower bearing 10, or it may be carried by a bar extending across the machine above the line of seed casings 3.

It must be understood that the invention is not limited to the particular construction of distributor or feeding device described and illustrated, inasmuch as various other constructions may be devised without departing from the spirit of the invention.

What I claim is:—

1. Seed distributing means for seed drills, comprising in combination a cylindrical casing, seed inlet means to said casing, an axially rotating member in said casing, a seed discharge aperture in the wall of said casing located adjacent the periphery of the rotating member, a coulter tube associated with said aperture, a baffle member associated with said aperture and shaped to prevent direct access of seed to said aperture, whilst permitting seed to be carried to said aperture by the periphery of the rotating member, and means for vibrating said rotating member, said means being capable of being thrown out of action when desired.

2. Seed distributing means for seed drills, comprising in combination a cylindrical casing, seed inlet means to said casing, an axially rotating member in said casing, a seed discharge aperture in the wall of said casing located adjacent the periphery of the rotating member, a coulter tube associated with said aperture, a baffle member associated with said aperture and shaped to prevent direct access of seed to said aperture, whilst permitting seed to be carried to said aperture by the periphery of the rotating member, a transverse driving shaft, gearing operatively associating the rotating member with said driving shaft and permitting axial movement of said rotating member, a toothed wheel fixed on said driving shaft, an axial pip associated with said rotating member, and spring means normally holding said rotating member with said pip in contact with said toothed wheel.

3. Seed distributing means as set forth in claim 2, including ratchet teeth on said toothed wheel, so disposed as to give a comparatively slow downward movement of the rotating member, but a sudden upward return movement.

4. A seed distributor for seed drilling machines, comprising in combination a cylindrical seed container having a peripheral seed ejection aperture, an adjustable baffle member screening said aperture except from one direction, said baffle member having a stepped cut-off edge co-operating with said aperture, rotary feeding means for carrying the seed in a continuous stream from said container behind said baffle and discharging it through said aperture, and means for vibrating said rotary feeding means.

5. A seed distributor for seed drilling machines, comprising in combination a cylindrical seed container having a peripheral seed ejection aperture, an adjustable baffle member screening said aperture except from one direction, said baffle member having a stepped cut-off edge co-operating with said aperture, rotary feeding means for carrying the seed in a continuous stream from said container behind said baffle and discharging it through said aperture, and means for vibrating said rotary feeding means in an axial direction.

6. A seed distributor for seed drilling machines, comprising in combination a cylindrical seed container having a peripheral seed ejection aperture, an adjustable baffle member screening said aperture except from one direction, said baffle member having a stepped cut-off edge co-operating with said aperture, rotary feeding means for carrying the seed in a continuous stream from said container behind said baffle and discharging it through said aperture, and means for vibrating said rotary feeding means in an axial direction with a sudden upward return movement and a slower downward movement.

7. Seed distributing means for seed drills, comprising in combination a cylindrical casing, seed inlet means to said casing, an axially rotating member in said casing, a seed discharge aperture in the wall of said casing located adjacent the periphery of the rotating member, a coulter tube associated externally with said aperture, a baffle member associated internally with said aperture and shaped to define with said rotating member and the wall of the casing a closed peripheral passage of gradually decreasing cross section, the seed being carried into the wide end of said channel by said rotating member and discharged through the discharge aperture of the casing after traveling a predetermined distance along said passage, and means for vibrating said rotating member, said vibrating means being arranged to be thrown out of action when desired.

8. Seed distributing means for seed drills, comprising in combination a cylindrical casing, seed inlet means to said casing, an axially rotating member in said casing, a seed discharge aperture in the wall of said casing located adjacent the periphery of the rotating member, a coulter tube associated externally with said aperture, a baffle member associated internally with said aperture and shaped to define with said rotating member and the wall of the casing a closed peripheral passage of gradually decreasing cross section, the seed being carried into the wide end of said channel by said rotating member and discharged through the discharge aperture of the casing after traveling a predetermined distance along said passage, and means for vibrating said rotating member.

9. Seed distributing means for seed drills, comprising in combination a cylindrical casing, seed inlet means to said casing, an axially rotating member in said casing, a seed discharge aperture in the wall of said casing located adjacent the periphery of the rotating member, a coulter tube associated externally with said aperture, a baffle member associated internally with said aperture and shaped to define with said rotating member and the wall of the casing a closed peripheral passage of gradually decreasing cross section, the seed being carried into the wide end of said channel by said rotating member and discharged through the discharge aperture of the casing after traveling a predetermined distance along said passage, and means for vibrating said rotating member in an axial direction.

10. Seed distributing means for seed drills, comprising in combination a cylindrical casing, seed inlet means to said casing, an axially rotating member in said casing, a seed discharge aperture in the wall of said casing located adjacent the periphery of the rotating member, a coulter tube associated externally with said aperture, and a baffle member associated internally with said aperture and shaped to define with said rotating member and the wall of the casing a closed peripheral passage of gradually decreasing cross section, the seed being carried into the wide end of said channel by said rotating member and discharged through the discharge aperture of the casing after traveling a predetermined distance along said passage, said baffle member being adjustable peripherally of the casing to vary the size of the channel in the baffle member where it overlaps the discharge aperture in the casing.

11. Seed distributing means for seed drills, comprising in combination a cylindrical casing, seed inlet means to said casing, an axially rotating member in said casing, a seed discharge aperture in the wall of said casing located adjacent the periphery of the rotating member, a coulter tube associated externally with said aperture, and a baffle member associated internally with said aperture and shaped to define with said rotating member and the wall of the casing a closed peripheral passage of gradually decreasing cross section, the seed being carried into the wide end of said channel by said rotating member and discharged through the discharge aperture of the casing after travelling a predetermined distance along said passage, said baffle member being so shaped that peripheral adjustment thereof in relation to said casing varies the effective size of said aperture in both height and width.

12. Seed distributing means for seed drills, comprising in combination a cylindrical casing, seed inlet means to said casing, an axially rotating member in said casing, a seed discharge aperture in the wall of said casing located adjacent the periphery of the rotating member, a coulter tube associated with said aperture, and a baffle member associated with said aperture and shaped to define with said rotating member and the wall of the casing a closed peripheral passage of gradually decreasing cross section, seed being carried into the wide end of said channel by said rotating member and discharged through the discharge aperture of the casing after travelling a predetermined distance along said passage, said baffle member having a stepped cut-off edge such that peripheral adjustment thereof in relation to said casing varies the effective width and height of said aperture.

13. Seed distributing means for seed drills, comprising in combination a cylindrical casing, seed inlet means to said casing, an axially rotating member in said casing, a plurality of seed discharge apertures in the wall of said casing located adjacent the periphery of the rotating member, a peripherally adjustable ring within said casing, and a plurality of baffle members carried by said ring in association with said apertures, said baffle member being shaped to define with said rotating member and the wall of the casing a closed peripheral passage of gradually decreasing cross section, the seed being carried into the wide end of said channel by said rotating member and discharged through the discharge aperture of the casing after travelling a predetermined distance along said passage.

14. Seed distributing means for seed drills, comprising in combination a cylindrical casing, seed inlet means to said casing, an axially rotating member in said casing, a plurality of seed discharge apertures in the wall of said casing located adjacent the periphery of the rotating member, a plurality of baffle members associated with said apertures and shaped to define with said rotating member and the wall of the casing a closed peripheral passage of gradually decreasing cross section, seed being carried into the wide end of said channel by said rotating member and discharged through the discharge aperture of the casing after travelling a predetermined distance along said passage, a peripherally adjustable ring within said casing from which said baffle members project radially inwards, external means for adjusting said ring peripherally within said casing, a scale fixed on the seed drill frame, and a pointer associated with said adjusting means and cooperating with said scale to indicate the adjustment of said baffle members.

15. A seed distributor for seed drilling machine, comprising in combination a seed container having a seed ejection aperture, an adjustable baffle member screening said aperture but providing a peripheral closed channel thereto, adjustment of said baffle member varying both the effective height and width of said ejection aperture, and feeding means for transferring seed from said container to said ejection aperture along said channel.

16. A seed distributor for seed drilling machines, comprising in combination a cylindrical seed container having a peripheral seed ejecting aperture, a peripherally adjustable baffle member screening said aperture but providing a peripheral closed channel leading to said aperture, peripheral adjustment of said baffle member varying both the effective height and width of said ejection aperture, and rotary feeding means for carrying the seed in a continuous stream from said container along said channel, and discharging it through said aperture.

In testimoy whereof I have signed my name to this specification.

HUGH MARTIN LEAKE.